May 5, 1925.                                                 1,536,233
R. D. MERSHON
BALANCING MEANS FOR ELECTROLYTIC APPARATUS
Filed Oct. 4, 1919
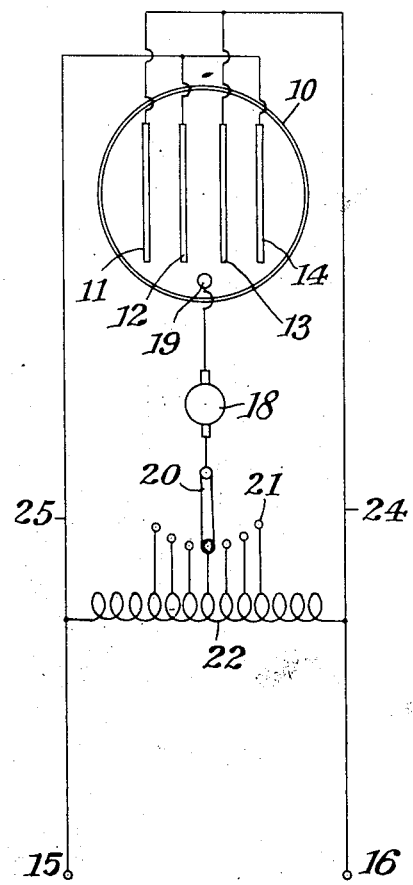
Ralph D. Mershon
Inventor
By his Attorneys
Kerr, Page, Cooper & Hayward Patented May 5, 1925.

UNITED STATES PATENT OFFICE.

RALPH D. MERSHON, OF NEW YORK, N. Y.

BALANCING MEANS FOR ELECTROLYTIC APPARATUS.

Application filed October 4, 1919. Serial No. 328,467.

*To all whom it may concern:*

Be it known that I, RALPH D. MERSHON, a citizen of the United States, residing at New York, county and State of New York, have invented certain new and useful Improvements in Balancing Means for Electrolytic Apparatus, of which the following is a full, clear, and exact description.

This invention relates to electrolytic apparatus, particularly condensers of the "excited" type. In such apparatus it is desirable that the groups or sets of active electrodes, that is, the electrodes which are covered with dielectric films, should be equal in area exposed to or immersed in the electrolyte. In other words the groups should be balanced. In a properly designed condenser this condition can in most cases be easily obtained with sufficient accuracy, but it sometimes happens otherwise, and occasionally in use an unbalanced condition arises. In either case a pulsating current through the exciting source will result, due to the fact that the electrode-group having the smaller area takes more of the impressed voltage than does the other group. In such event it is customary to make the desired adjustment by removing one or more of the electrodes and altering their size. This method is not always convenient or practicable, and it is accordingly the chief object of the present invention to provide means by which the unbalanced condition can be corrected externally without disturbing the electrodes.

In carrying out the invention in the preferred manner I provide the usual source of unidirectional current for exciting the condenser, one terminal of such source being connected to an electrode (immersed in the electrolyte) which does not take on a film when current is impressed on the apparatus. This electrode, which may be composed of any suitable material, as for example carbon or nickel, may for convenience be termed the cathode; the active or filmed electrodes being termed anodes. The other terminal of the source of exciting current is connected to the neutral point of an auto-transformer or balance coil which is itself connected across the condenser terminals, but the connection of the exciting source to the balance coil is not permanent. On the contrary the connection is adjustable, as by bringing out from different points on the coil a plurality of taps, to any one of which the exciting source may be connected at will. Then if at any time it is found that the apparatus is unbalanced, resulting in a pulsating current through the exciting source, the connection of the latter to the balance coil can be shifted to a point at which such pulsations cease or are diminished to a desired degree.

The embodiment outlined above is illustrated in the accompanying drawing, in which it is shown diagrammatically.

The electrolytic apparatus, illustrated, in the present instance a condenser, comprises a suitable vessel 10 containing a suitable electrolyte and a plurality of anodes designated 11, 12, 13, 14, of which 11 and 13 are, as usual, connected in parallel to the terminal 16 and 12 and 14 in parallel to the terminal 15. The source of unidirectional exciting current is indicated at 18, and has its negative terminal connected internally to the condenser by means of the cathode 19, immersed in the electrolyte. The positive terminal of the source 18 is connected to the condenser externally by means of a switch arm 20, adapted to traverse a series of points 21 connected by suitable taps or leads to the balance coil or auto-transformer 22 which is itself connected across the main leads 24, 25. The positive pole of the source 18 being connected to the auto-transformer 22 it will be seen that the exciting current opposes the rectifying action of the apparatus (explained at length in my prior Patent No. 1,077,628, page 4, lines 24 to 110) which produces a unidirectional potential tending to send current from the auto-transformer through the source 18 to the electrolyte. It is also explained in my prior patent just mentioned (page 2, lines 84 to 101, and page 3, lines 4 to 64) that this unidirectional E. M. F. is pulsating if the circuit is closed, but that if no current is allowed to flow the E. M. F. is constant and equal to one-half the maximum value of the impressed alternating E. M. F. Inasmuch as the exciting current opposes the current which would otherwise flow by reason of the unidirectional E. M. F. the apparatus will behave as if the rectifying circuit were open, provided the exciting voltage is at least equal to the maximum voltage of the impressed alternating E. M. F. In such case the constant E. M. F. due to the rectifying tendency is opposed by the greater constant E. M. F. of the exciting source and hence the unidirectional exciting voltage impressed on the anodes is constant, that is, non-pulsating. This action is of course postulated on the assumption that the exciting source is connected to the neutral point of the transformer. But the point which is neutral when the two anode groups are equal in area is not equal when the group areas are unequal. In the latter case the electrolytic condenser, which is in effect two condensers in series, behaves as if one of the condensers had less capacity than the other; in which event— since of two condensers in series the one of smaller capacity tends to take more than one-half of the impressed voltage—there is a component of alternating E. M. F. between the electrolyte and the point of attachment thereof to the auto-transformer. As the result the auto-transformer tends to establish equality of voltage between the two condensers by allowing additional alternating current to flow through the condenser of greater capacity, by way of the auto-transformer and the exciting source, thus producing pulsations in the exciting current which may be so great as actually to result in reversal thereof. If the total effective area of anodes 11 and 13 and the total effective area of anodes 12 and 14, are equal, and if the number of turns of the balance coil 22 is the same on both sides of its center, the neutral point of the coil will be at its center and the switch arm 20 should therefore be placed on the middle tap, as shown. But if one set of anodes has a greater effective area than the other, or if the middle point of the coil is not also its neutral point, or if both these conditions exist, the trouble can be corrected by shifting the switch arm to right or left, as the case may be, until the desired balance, or the desired approximation thereto, is obtained.

It is to be understood that the invention is not limited to the arrangement herein specifically illustrated and described but can be embodied in other forms without departure from its spirit.

I claim:

1. In combination, an electrolytic condenser, and a source of unidirectional current having a terminal connected to the condenser electrolyte and having another terminal adjustably connected to the condenser anodes to balance the condenser.

2. In combination, an electrolytic condenser having leads for connection with an external circuit, a balance coil connected across said leads, a source of unidirectional current having a terminal connected with the condenser electrolyte, and means for connecting another terminal of said source to any of a plurality of points on the balance coil.

3. In combination, an electrolytic condenser having a plurality of anodes connected in groups and having a cathode, a balance coil connected across the groups of anodes, a source of unidirectional current having a terminal connected with the cathode, and means for adjustably connecting another terminal of said source to the balance coil.

4. In combination, an electrolytic condenser having a plurality of electrodes connected in groups, a balance coil connected across said groups, a source of unidirectional current having a terminal connected to the condenser electrolyte, and adjustable means between the balance coil and another terminal for the said source of connecting the latter to the balance coil at the neutral point thereof.

5. The combination with an electrolytic condenser comprising a plurality of anodes connected in groups, and an electrolyte in which the anodes are immersed, of adjustable means electrically connected to the condenser anodes and to the electrolyte to balance the condenser.

In testimony whereof I hereunto affix my signature.

RALPH D. MERSHON.